US009469972B2

(12) United States Patent
Ge

(10) Patent No.: US 9,469,972 B2
(45) Date of Patent: Oct. 18, 2016

(54) ADAPTIVE CONTROL SYSTEM FOR CYCLIC EXCAVATION MACHINE

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 288 days.

(21) Appl. No.: 14/324,602

(22) Filed: Jul. 7, 2014

(65) Prior Publication Data

US 2016/0003171 A1 Jan. 7, 2016

(51) Int. Cl.
*F16H 59/14* (2006.01)
*E02F 9/22* (2006.01)
*E02F 9/26* (2006.01)

(52) U.S. Cl.
CPC ............. *E02F 9/2246* (2013.01); *E02F 9/265* (2013.01); *E02F 9/267* (2013.01); *F16H 59/14* (2013.01); *F02D 2200/501* (2013.01); *F16H 2059/142* (2013.01)

(58) Field of Classification Search
None
See application file for complete search history.

(56) References Cited

U.S. PATENT DOCUMENTS

| 3,632,176 | A | | 1/1972 | Gaeke | |
|---|---|---|---|---|---|
| 4,955,344 | A | * | 9/1990 | Tatsumi | E02F 9/2025 123/352 |
| 5,036,669 | A | * | 8/1991 | Earleson | F02D 35/021 123/239 |
| 6,112,729 | A | * | 9/2000 | Barnes | F02D 41/0052 123/568.21 |
| 6,944,532 | B2 | | 9/2005 | Bellinger | |
| 7,483,808 | B2 | | 1/2009 | Greiner et al. | |
| 8,374,755 | B2 | | 2/2013 | Lin et al. | |
| 2003/0000205 | A1 | * | 1/2003 | Lewis | F01N 3/0814 60/285 |
| 2014/0174404 | A1 | * | 6/2014 | Coldren | F02D 19/0605 123/459 |

FOREIGN PATENT DOCUMENTS

EP 0838141 4/1998

* cited by examiner

*Primary Examiner* — Justin Holmes
(74) *Attorney, Agent, or Firm* — Finnegan, Henderson, Farabow, Garrett & Dunner, LLP

(57) ABSTRACT

A control system is disclosed for use with a powertrain of a machine. The control system may have a first sensor configured to generate a first signal indicative of an actual speed, a second sensor configured to generate second signal indicative of at least one of a force bearing on the machine and a position of an implement, and an interface device configured to generate a third signal indicative of a desired speed. The control system may also have a controller configured to determine a closed-loop gain value based on a difference between the actual and desired speeds, to classify a current operation of the machine based on the second signal, and to determine an open-loop gain value based on classification of the current operation. The controller may also be configured to control fueling of the machine based on a superposition of the closed-loop gain value and the open-loop gain value.

20 Claims, 3 Drawing Sheets

ADAPTIVE CONTROL SYSTEM FOR CYCLIC EXCAVATION MACHINE

TECHNICAL FIELD

The present disclosure relates generally to a control system, and more particularly, to an adaptive control system for a cyclic excavation machine.

BACKGROUND

Excavation machines, for example hydraulic excavators, wheel loaders, and front shovels operate according to known cycles to excavate and load material onto nearby haul vehicles at a worksite. A typical cycle includes a dig segment, a move-to-truck segment, a dump segment, and a move-to-trench segment. During each of these segments, the excavation machine performs differently and is subjected to different loads. For example, during the dig segment, high forces are required to push an empty tool into the material, while during the move-to-truck segment, high accelerations and high velocities are required for use with a loaded work tool. During the move-to-trench segment, lower accelerations and high velocities are required for use with an empty work tool.

The engine speed of the excavation machine is set by an operator, and can be affected by loading. For example, the operator sets the speed of the engine to a desired speed (e.g., to high-idle) at the start of the excavation cycle, and the actual speed of the engine may droop under or shoot over the desired speed according to loading of the work tool and/or movement of the machine over different grades at the worksite. Specifically, when high forces and/or accelerations are suddenly placed on the machine (e.g., during the dig segment, the move-to-truck segment, or travel up a steep grade), the engine speed may droop. And when the forces are suddenly removed (e.g., during the dump segment, move-to-trench segment, or travel down a steep grade), the engine speed may overshoot.

Engine speed fluctuations can result in reduced responsiveness, low production, and/or inefficiencies. In particular, when engine speed droops, the engine may not immediately produce the power necessary to move the work tool and load in the manner requested by the operator. In addition, at low engine speeds, an amount of combustion air provided to the engine by associated turbochargers may also be low, thereby limiting an amount of fuel that can be supplied to the engine. This fuel limit can result in a lag or delay in how quickly the engine can speed back up to the desired speed. In addition, the desired speed is often a speed at which engine efficiencies (e.g., fuel efficiency and/or exhaust emission efficiency) are heightened. Accordingly, deviations from the desired speed can result in undesired performance.

One way to improve engine performance of a machine during an excavation cycle is disclosed in U.S. Pat. No. 8,374,755 of Lin et al. that issued on Feb. 12, 2013 ("the '755 patent"). Specifically, the '755 patent discloses an excavation machine control system having a power source, an operator interface device configured to generate a signal indicative of a desired mode of power source operation, a work implement driven by the power source, and a controller. The controller is configured to classify a currently performed task and select an output map based on the classification and the desired mode of operation. The controller is further configured to control the power source using the output map, such that fuel efficiency and exhaust emissions are improved.

Although the control system of the '755 patent may improve engine performance, the system may still be less than optimal. In particular, the system may not consider all factors affecting engine performance or be able to adapt to changing performance over a life of the machine.

The disclosed control system is directed to overcoming one or more of the problems set forth above and/or other problems in the prior art.

SUMMARY

One aspect of the present disclosure is directed to a control system for a powertrain of a machine. The control system may include a first sensor configured to generate a first signal indicative of an actual speed of the powertrain, a second sensor configured to generate second signal indicative of at least one of a force bearing on the machine and a position of an implement of the machine, and an interface device configured to generate a third signal indicative of a desired speed of the powertrain. The control system may also have a controller in communication with the first sensor, the second sensor, and the interface device. The controller may be configured to determine a closed-loop gain value based on a difference between the actual speed and the desired speed, to classify a current operation of the machine as one of a plurality of predetermined operations of a duty cycle based on the second signal, and to determine an open-loop gain value based on classification of the current operation of the machine. The controller may also be configured to control fueling of the machine based on a superposition of the closed-loop gain value and the open-loop gain value.

Another aspect of the present disclosure is directed to a method for controlling a powertrain of a machine. The method may include sensing an actual speed of the powertrain, sensing at least one of a force bearing on the machine and a position of an implement of the machine, and receiving a desired speed of the powertrain. The method may also include determining a closed-loop gain value based on a difference between the actual speed and the desired speed, and classifying a current operation of the machine as one of a plurality of predetermined operations of a duty cycle based on the at least one of the force bearing on the machine and the position of the implement of the machine. The method may further include determining an open-loop gain value based on the current operation of the machine, and controlling fueling of the machine based on a superposition of the closed-loop gain value and the open-loop gain value.

Yet another aspect of the present disclosure is direct to computer programmable media having instructions stored thereon for performing a method for controlling a powertrain of a machine. The method may include sensing an actual speed of the powertrain, sensing at least one of a force bearing on the machine and a position of an implement of the machine, and receiving a desired speed of the powertrain. The method may also include determining a closed-loop gain value based on a difference between the actual speed and the desired speed, and classifying a current operation of the machine as one of a plurality of predetermined operations of a duty cycle based on the at least one of the force bearing on the machine and the position of the implement of the machine. The method may further include determining an open-loop gain value based on the current operation of the machine, and controlling fueling of the machine based on a superposition of the closed-loop gain value and the open-loop gain value.

DETAILED DESCRIPTION

Figure 1:
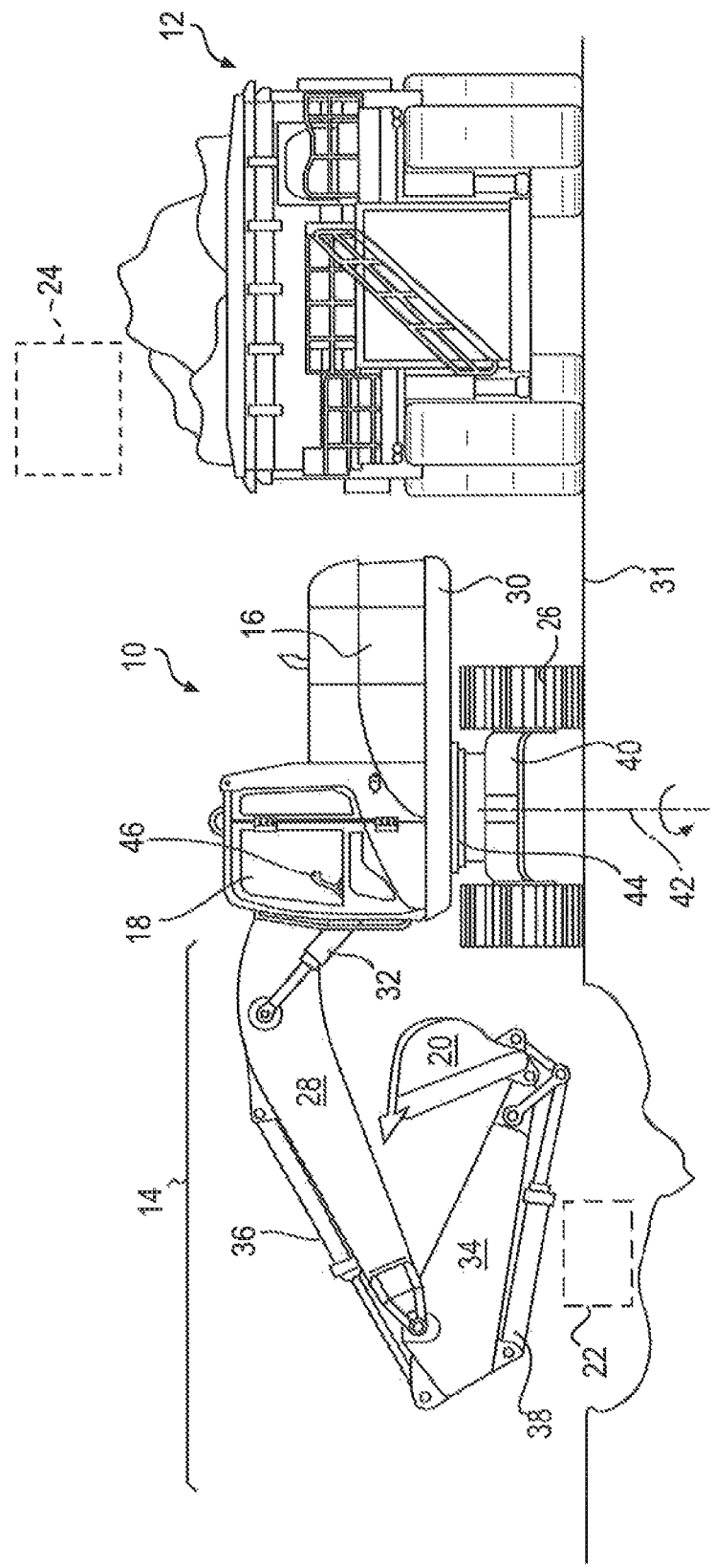
FIG. 1 is a diagrammatic illustration of an exemplary machine according to an aspect of the disclosure.

FIG. 1 illustrates an exemplary machine 10 having multiple systems and components that cooperate to excavate and load earthen material onto a nearby haul vehicle 12. In the disclosed example, machine 10 is a hydraulic excavator. It is contemplated, however, that machine 10 may embody another type of excavation machine such as a backhoe, a front shovel, a wheel loader, a haul truck, or another similar machine. Machine 10 may include, among other things, an implement system 14, a powertrain 16, and an operator station 18 for manual control of implement system 14 and powertrain 16. Implement system 14 may be driven by powertrain 16 to repetitively move a work tool 20 between a dig location 22 within a trench and a dump location 24 over haul vehicle 12 during completion of a particular excavation or duty cycle. It is contemplated, however, that implement system 14 may be configured to move work tool 20 in another manner during a different excavation cycle, if desired. Powertrain 16, in addition to driving implement system 14, may also function to propel machine 10, for example via one or more traction devices 26.

As shown in FIG. 1, the disclosed implement system 14 includes a linkage structure that cooperates with fluid actuators to move work tool 20. Specifically implement system 14 may include a boom 28 that is pivotally connected to a body 30 of machine 10 and vertically movable by a pair of hydraulic cylinders 32 (only one shown in FIG. 1). Implement system 14 may also include a stick 34 that is pivotally connected between boom 28 and work tool 20, and movable by a single hydraulic cylinder 36. Implement system 14 may further include a single hydraulic cylinder 38 operatively connected to vertically pivot work tool 20 relative to stick 34. Body 30 may be connected to an undercarriage member 40, and swung (together with boom 28, stick 34, and work tool 20) about a vertical axis 42 by a swing motor 44. It is contemplated that a greater or lesser number of fluid actuators may be included within implement system 14 and/or connected in a manner other than described above, if desired. Although fluid actuators are shown in FIG. 1 for manipulating the implement system 14, it will be appreciated that the implement system 14 may include other types of actuators known in the art, such as electric motors, for example.

Powertrain 16 may include, among other things, an engine configured to produce a rotational power output, and a transmission that converts the power output to a desired ratio of speed and torque. The rotational power output may be used to drive a pump that supplies pressurized fluid to cylinders 32, 36, and 38; to motor 44; and/or to one or more motors (not shown) associated with traction devices 26. In some embodiments, the rotational power output of the engine may additionally be directed to drive a generator that produces electricity used to control machine 10. The engine of powertrain 16 may be a combustion engine configured to burn a mixture of fuel and air, the amount and/or composition of which directly corresponding to the rotational power output. The transmission of powertrain 16 may take any form known in the art, for example a power shift configuration that provides multiple discrete operating ranges, a continuously variable configuration, or a hybrid configuration.

Operator station 18 may be configured to receive input from a machine operator indicative of desired machine operations. Specifically, operator station 18 may include one or more operator interface devices 46, 48 (shown only in FIG. 2) located proximate an operator seat (not shown). Interface devices 46, 48 may be embodied as joysticks, pedals, switches, wheels, knobs, and/or any other device known in the art. Interface devices 46, 48 may be configured to generate signals that are used to control machine 10.

For example, interface device 46 may be a joystick that, when displaced from a neutral position, creates a signal indicative of a desired machine or tool speed or force in a particular direction. This signal may be then be used to actuate any one or more of hydraulic cylinders 32, 36, 38; swing motor 44; and/or the traction motors discussed above. In this same example, interface device 48 may be a pedal, a switch, or a pedal/switch combination that functions to set a desired speed for powertrain 16. That is, the signal generated by interface device 48 may be indicative of a desired rotational speed of powertrain 16 (e.g., an engine speed) that should be maintained during completion of the excavation work cycle. As the actual speed of powertrain 16 deviates from the desired speed, the amount of fuel delivered to powertrain 16 may be automatically adjusted in an amount based on the deviation.

Numerous different work tools 20 may be attachable to a single machine 10 and controllable via operator station 18. Work tool 20 may include any device used to perform a particular task such as, for example, a bucket, a fork arrangement, a blade, a shovel, a truck bed, or any other task-performing device known in the art. Although connected in the embodiment of FIG. 1 to pivot relative to machine 10, work tool 20 may alternatively or additionally rotate, slide, swing, lift, or move in any other manner known in the art.

Figure 2:
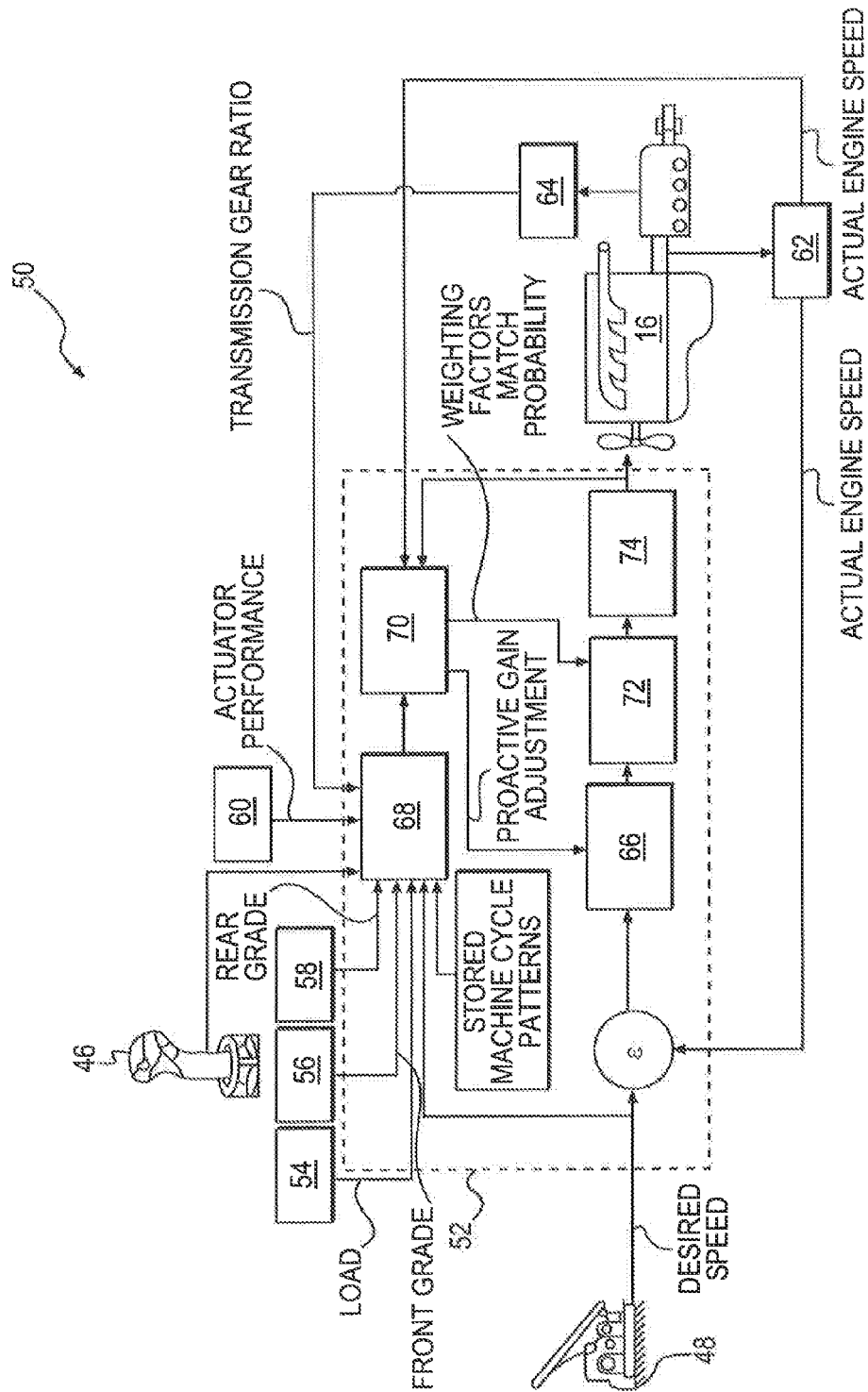
FIG. 2 is a diagrammatic illustration of an exemplary control system that may be used with the machine of FIG. 1 according to an aspect of the disclosure.

As illustrated in FIG. 2, machine 10 may further include a control system 50 configured to monitor, classify, and control operations of machine 10 and work tool 20 (referring to FIG. 1). In particular, control system 50 may include a plurality of sensors, and a controller 52 that is in communication with the sensors; with interface devices 46, 48; and with powertrain 16. The sensors communicating with controller 52 may include a load sensor 54, a front grade sensor 56, a rear grade sensor 58, one or more actuator sensors 60, an engine speed sensor 62, a transmission sensor 64, combinations thereof, or any another sensor known in the art.

Load sensor 54 may be configured to generate a signal indicative of a load carried by, moved by, or otherwise bearing on machine 10. In one example, load sensor 54 is a pressure sensor associated with any one or more of cylinders 32, 36, and 38, the signal from this sensor being used to calculate a load on the corresponding cylinder that can be related to the load carried by work tool 20. In another example, load sensor 54 is a mechanical load cell strategically placed between mating mechanical components of machine 10 (e.g., between linkage members) and/or on support structure of implement system 14, the signal from this sensor being related to strain of the components and used to calculate the load on work tool 20. Other types of load sensors may also be possible. The signals from load sensor 54 may be directed to controller 52 for further processing.

Grade sensors 56, 58 may together be configured to determine a grade of a work surface 31 under machine 10. For example, each grade sensor 56, 58 may be configured to generate a signal indicative of a position and/or orientation of a particular point on machine 10 (e.g., of an intermediate point on an associated front or rear axle). The two positions/orientations may then be used together to calculate an overall pitch of machine 10 in a travel direction, and a corresponding grade of work surface 31 under machine 10. In an alternative embodiment, grade sensor 56 and/or 58 may each be an Inertial Measurement Unit (IMU) having one or more accelerometers and/or gyroscopes that generate signals indicative of the change in machine orientation relative to the force of gravity. It is contemplated that other types of sensors may alternatively be used to determine the grade of work surface 31, and/or that one of sensors 56, 58 may be omitted, if desired. Signals generated by sensors 56, 58 may be directed to controller 52 for further processing.

Actuator sensors 60 may be associated with the motion of work tool 20 imparted by any one or more of cylinders 32, 36, 38 and/or swing motor 50. For example, sensors 60 may each be a rotational position and/or speed sensor associated with the pivoting and/or swinging motion of implement system 14; a local or global coordinate position and/or speed sensor; an extension sensor located internally or externally of cylinders 32, 36, and 38; a fluid pressure sensor; or any other type of sensor known in the art that may generate a signal indicative of a pivot position, acceleration, speed, and/or force of implement system 14. This signal may be sent to controller 52 for further processing. It is contemplated that controller(s) 52 may derive any number of different parameters based on the signals from sensors 60 and an elapsed period of time (e.g., a time period tracked by an internal or external timer—not shown), if desired.

Engine sensor 62 may be associated with a rotating component of powertrain 16, and configured to generate a signal indicative of an actual speed and direction thereof. For example, sensor 62 may be associated with a crankshaft (not shown) of powertrain 16 and/or with a transmission input or output shaft. Speed sensor 62 may include a permanent magnet imbedded in any of these rotating shafts, and a stationary sensing element (e.g., a hall-effect element) spaced near the component and configured to detect a rotating field produced by the magnet. Signals generated by the sensing element of sensor 62 may be directed to controller 52 for further processing.

Transmission sensor 64 may be configured to detect and/or determine a current gear ratio of powertrain 16. In some embodiments, sensor 64 may be directly associated with powertrain 16 and configured to detect a ratio of input speed-to-output speed. For example, sensor 64 may be a pressure sensor or a rotational speed sensor. In another example, sensor 64 may be associated with operator station 18 (e.g., for example with a shift lever in operator station 18—not shown), and configured to determine a transmission gear ratio selected by the operator. Sensor 64 may alternatively embody a different type of sensor, if desired. Signals generated by sensor 64 may be directed to controller 52 for further processing.

It should be noted that, while only a single controller 52 is shown in FIG. 2 as communicating with sensors 54-60, any number of separate controllers may collaborate to perform the functions of control system 50. And each of these controllers may include a single module or multiple modules. In the exemplary embodiment of FIG. 2, the disclosed controller 52 has five different modules. These modules include a Proportional Integral (PI) module 66, a pattern recognition module 68, an adjustment module 70, a probability and weighting factors module 72, and a fuel/smoke limit module 74. Numerous commercially available microprocessors can be configured to perform the functions of the different modules of controller 52. It should be appreciated that controller 52 could additionally be embodied in a general machine microprocessor capable of controlling numerous machine functions. Some or all of the modules of controller 52 may include a memory, a secondary storage device, a processor, and any other components for running an application. Various other circuits may be associated with the modules of controller 52, such as power supply circuitry, signal conditioning circuitry, solenoid driver circuitry, and other types of circuitry.

Based on input received from interface device 48 and engine speed sensor 62, controller 52 (e.g., module 66) may be configured to adjust fueling of powertrain 16. In particular, module 66 may be configured to determine an error value indicative of a difference between a desired engine speed (derived, for example, from a displacement position of interface device 48) and an actual engine speed (derived, for example, from the signal generated by sensor 62). The error value may then be referenced with a lookup table, for example, to determine an incremental gain or adjustment value (e.g., a closed-loop gain value) that should be made to the current fueling of powertrain 16 in order to reduce the error.

Based on input received from any one or all of sensors 54-60 and/or from interface devices 46, 48, controller 52 may also be configured to classify a current operation of machine 10 as one of a plurality of known segments of the excavation cycle, determine a total load on machine 10, and selectively determine a second gain or adjustment value (e.g., an open-loop gain value) as a function of the classification and the total load. The second gain value may then be superimposed on the first gain value and used to control fueling of powertrain 16, as will be described in more detail in the following section.

The current operation of machine 10 may be classified by controller 52 (e.g., by module 68) as a particular segment of the repetitive excavation cycle discussed above. For example, the current operation may be classified as one of a dig segment, a move-to-truck segment, a dump segment, and a move-to-trench segment. It is contemplated, however, that controller 52 may alternatively classify the current operation of machine 10 as another segment known in the art (e.g., a segment associated with a haul truck cycle or a dozing cycle), if desired.

One or more maps relating signals from sensors 54-64 and/or interface devices 46, 48 to the different segments of the excavation cycle may be stored within the memory of controller 52 (e.g., with the memory of module 68). Each of these maps may include a collection of data in the form of tables, graphs, and/or equations. In one example, threshold speeds associated with the start and/or end of one or more of the operations may be stored within the maps. In another example, threshold forces associated with the start and/or end of one or more of the operations may be stored within the maps. In yet another example, positions of machine 10 and/or linkages of implement system 14 may be associated with the operations and stored in the maps. In a final embodiment, a pattern of movements received via interface device 46, 48 may be related to particular operations and stored in the maps of controller 52.

Controller 52 (e.g., module 68) may classify the current operation of machine 10 as one of the known segments of the excavation cycle typically performed by machine 10 based on signals received from sensors 54-60 and/or interface devices 46, 48 and based on the maps stored in memory. In some embodiments, controller 52 may classify the operation based on multiple different conditions being satisfied, for example one condition associated with the swing motion of boom 28, one condition associated with the pivoting motion and/or force of boom 28, one condition associated with the pivoting motion and/or force of stick 34, one condition associated with the pivoting motion and/or force of work tool 20, and/or one condition associated with a pattern of input movements received from the operator via interface device 46. For example, controller 52 may classify the current excavation operation as the dig operation or the move-to-truck operation when a current swing speed of machine 10 falls below or exceeds a percent of a maximum swing speed, when the pivot speed falls below or exceeds a threshold speed value, when the pivot force is less or greater than a threshold value, and/or when the pattern of input from the operator matches or nearly matches a stored input pattern. The other operations of machine 10 may be classified in a similar manner. The maximum and/or threshold speeds and forces, as well as the pattern of inputs, may vary based on a size of machine 10 and an application thereof. As will be described in more detail below, controller 52 (e.g., module 68) may be configured to compare recorded operations of machine 10 to the pattern of operations stored in memory, and to match the current operation of machine 10 with a particular segment of the excavation cycle based on the comparison.

In some situations, the current operation may not perfectly match previously classified operations that are stored in the memory of controller 52. In these situations, controller 52 (e.g., module 68) may be configured to determine a probability that the current operation is a particular one of the previously classified operations. As will be described in more detail below, the probability may be calculated, at least in part, on how well the recorded operations match the stored operations. Controller 52 (e.g., module 70) may then be configured to selective affect the second gain value as a function of the probability.

Controller 52 may also be configured to determine a load acting on machine 10 that must be overcome by powertrain 16 in order to move machine 10 without causing undesired engine speed deviations. In the disclosed example, module 68 may also perform this function. It is contemplated, however, that another module (e.g., module 70 or a dedicated load module—not shown) could perform this function, if desired. The load may include a weight of material being moved by work tool 20 and an empty weight of machine 10 (i.e., a gross weight of machine 10). The weight of the material may be provided by way of load sensor 54; and the empty weight of machine 10 may be known. Controller 52 may add these values to determine the load.

In one embodiment, the load acting on machine 10 may be affected by the pitch (i.e., the grade of work surface 31) and/or travel direction of machine 10. For example, the load may increase when machine 10 is moving up a steep grade, and decrease when moving down a steep grade. Accordingly, controller 52 may be configured to reference the signals from grade sensors 56, 58, and determine a total load as a function of the load discussed above, the pitch of machine 10, and the travel direction relative to the pitch. Specifically, controller 52 may add to or subtract from the load an amount based on the pitch and the travel direction in order to determine the total load.

Likewise, the total load may be affected by the current gear ratio of powertrain 16. For example, when moving slowly up a steep grade with a heavy load in a low gear range, powertrain 16 may have to produce less power than when moving faster up the same grade in a high gear range. Accordingly, controller 52 may consider the current gear ratio of powertrain 16 when determining the total load that must be overcome by the engine to cause the desired movement of machine 10. Specifically, controller 52 may adjust (e.g., scale and/or offset) the total load an amount based on the current gear ratio of power train 16.

Controller 52 may be configured to execute instructions stored on computer readable medium to perform methods of machine control (e.g., fueling of powertrain 16) based on the past, current, and/or anticipated operations of machine 10, the total loading of machine 10, and the probability of the current operation being correctly classified. For example, when initiating raising of a fully loaded boom 28 during a classified move-to-truck segment of the excavation cycle (a situation during which speed droop of powertrain 16 normally occurs), it may be desirable to selectively increase fueling of powertrain 16 in anticipation of the speed droop to enhance machine efficiency and/or productivity. In contrast, when starting to lower boom 28 during a classified move-to-trench segment (a situation during which speed overshoot normally occurs), it may be desirable to selectively decrease fueling before overspeed can occur. In some situations, the anticipatory control of machine operation, based on operation classification, may be variable and affected by the probability of the classification match described above. Controller 52 (e.g., module 72) may execute the instructions to perform a method of control that generates incremental fueling changes to accommodate current and anticipated speed deviation events, and communicate this information to powertrain 16 for implementation.

In some applications, limits may be set on the fueling of machine 10 that controller 52 can implement. These limits may include a power-based limit associated with a maximum power and/or speed that drivetrain 16 is allowed to produce without causing damage to machine 10. These limits may also include a smoke-based limit associated with an amount of fuel that can be efficiently consumed without generating an undesirable amount of smoke. Accordingly, controller 52 (e.g., module 74) may be configured to selectively override the error-based fueling, which may have been offset and/or scaled based on classification, load, and/or probability, and to implement an alternative fueling adjustment. This overriding may be selectively implemented when the error-based fueling exceeds values stored within respective torque limit and/or smoke limit maps stored within the memory of controller 52.

Figure 3:
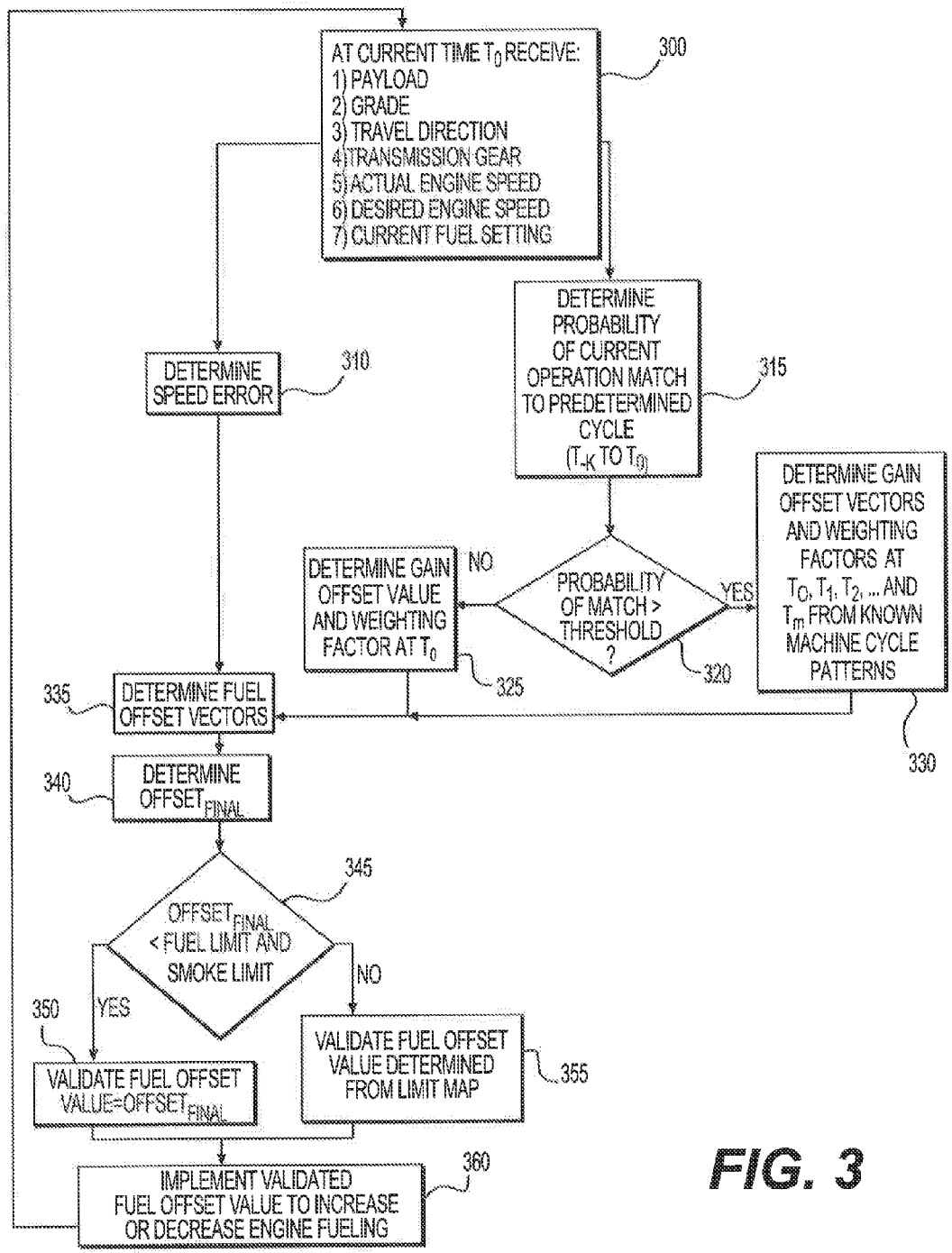
FIG. 3 is a flowchart illustrating an exemplary process that may be performed by the control system of FIG. 2 according to an aspect of the disclosure.

FIG. 3 illustrates the machine control method performed by controller 52. FIG. 3 will be discussed in more detail below to further explain the disclosed concepts.

INDUSTRIAL APPLICABILITY

The disclosed control system may be applicable to any machine that performs a substantially repetitive work cycle. The disclosed control system may enhance machine performance by determining a total load on the machine, classifying operations of the machine, and selectively affecting machine control based on the total load and classification. Operation of control system 50 will now be described with respect to FIG. 3.

During operation of machine 10, controller 52 may receive input from interface devices 46, 48; from sensors 54-64; and/or directly from powertrain 16. In particular, controller 52 may receive signals at a current time $T_0$ that are indicative of material payload currently inside work tool 20, of the grade of work surface 31 currently under machine 10, of the current travel direction of machine 10 with respect to the grade, of the current transmission gear ratio of powertrain 16, of the actual engine speed of power train 16, of the desired engine speed, and of the current fueling of powertrain 16 (Step 300).

In one example, at time $T_0$, machine 10 may be performing a truck loading cycle and attempting to lift work tool 20 when filled with relatively dense material. At this time, the desired engine speed (as set by interface device 48) may be about 1900 rpm. Due to the lifting motion of work tool 20 and the load therein at the start of the move-to-truck segment, a speed droop of about 400 rpm may normally occur, such that the actual engine speed might droop to about 1500 rpm. Using a conventional fuel governor, fueling of powertrain 16 may be incrementally increased after the speed droop is observed, and continue until the actual speed is within an acceptable threshold (e.g., about +/−20 rpm) of the desired engine speed. The incremental increase in fueling used by the conventional governor may be implemented using a standard closed-loop gain value permanently stored within a control map. However, this type of control may require a significant period of time to correct, which is unacceptable in many applications.

Instead, as will be explained in more detail below, controller 52 may be configured to use an anticipatory adjustment value that varies based on the total load of machine 10, as soon as a speed deviation greater than the threshold amount is observed. In this way, the actual engine speed may not droop as far as in conventional systems. For this purpose, sensor 54 may provide an indication as to the weight of the load in work tool 20, from which controller 52 may determine the total weight of machine 10. At this time in the disclosed example, machine 10 may be stationary, such that the travel speed, travel direction, gear ratio, and grade are not a concern and do not have an effect on the total weight. In other situations (e.g., during a haul truck cycle), however, the travel speed, direction, gear ratio, and grade may play into calculation of the total load. The current fueling of machine 10, at time $T_0$ in the disclosed example, may be about 8.5 mm rack (before adjustment) and known by controller 52 (as controller 52 would have previously commanded fueling at that rate).

Controller 52 may then determine a speed error based on a difference between the desired engine speed and the actual speed (Step 310). In particular, controller 52 may subtract the actual engine speed from the desired engine speed.

Before, during, and/or after completion of step 310 (e.g., in parallel with completion of step 310), controller 52 may determine a probability that the current operation of machine 10 matches a previously stored operation associated with a known excavation cycle (Step 315). In particular, based on any number of operational parameters (e.g., based on work tool movement, speed, force, load, position, operator input, travel speed, travel direction, transmission gear, etc.) recorded at any number of instants in time before time $T_0$ (e.g., $T_{-k}$ to $T_0$), controller 52 may conclude with a certain probability that the current operation at time $T_0$ is associated with a known segment of the excavation cycle. In the example above, and based on a loading profile and position of work tool 20 at times $T_{-4}$, $T_{-3}$, $T_{-2}$, and $T_{-1}$, controller 52 may determine that the current operation of machine 10 at time $T_0$ is part of the move-to-truck segment of the truck loading cycle. The probability that the current operation at time $T_0$ is a particular segment of the known excavation cycle may be calculated on how well the performance parameters recorded for times $T_{-4}$ to $T_0$ match the pre-recorded parameters. In the disclosed example, the probability that the current operation is associated with the move-to-truck segment is about 70%.

Controller 52 may then determine if the probability determined at step 315 exceeds a threshold probability (Step 320). In one example the threshold probability may be about 50%, although other values may also be utilized. If the probability is less than the threshold probability (step 320: NO), controller 52 may determine a closed-loop gain that should be used when determining the error-based offset value, and a weighting factor that should be applied to the gain (Step 325). The gain may be determined based on the total load of machine 10, the classification of the current operation, and an adaptive lookup table of values historically used under the same load conditions during the same segment to successfully maintain the desired engine speed; while the weighting factor may be determined based on the probability that the classification is correct.

It should be noted that a deviation of actual engine speed from the desired engine speed may not need to occur in order for controller 52 to calculate the gain that would be used to correct the speed error. In fact, the disclosed system benefits from continuously calculating the gain based on load and/or excavation cycle matching, regardless of a speed deviation, such that when the gain is required to correct an unacceptable speed deviation, the gain is already available. In this way, less of a speed droop may occur, as the gain will correct for the magnitude of the droop caused by the total load of machine 10.

If the probability of correct classification is more than the threshold probability (step 320: YES), controller 52 may determine an open-loop gain vector associated with future instants in time $T_0$ to $T_m$ (i.e., instead of a single closed-loop gain value), and corresponding weighting factors (Step 330). The vector of gain values may be determined based on an assumed continuation of the same excavation cycle (i.e., based on the segments of the excavation cycle assumed to be next completed), the total load (and how the load is expected to change, for example by completion of the ensuing segments), and the adaptive lookup table described above. The weighting factors in this situation may be determined based only in part on the probability that the classification is correct, and also in part based on the sequence of the instants in time $T_0$ to $T_m$. In particular, the weighting factors may be more heavily biased for closer instants in time. That is, the weighting factors may become smaller for increments of time further into the future, such that the weighting factors have less effect from more distant events that have not yet occurred. For example, the weighting factors $W_0$-$W_4$ for times $T_0$-$T_4$ in the given example may be (80%, 7%, 6%, 5%, 2%), wherein the weighting factor $W_0$ for time $T_0$ is significantly higher than the remaining weighting factors $W_1$-$W_4$.

It should be noted that the weighting factor $W_0$ for time $T_0$, when the probability of correct classification is below the threshold, may be greater than when the probability is above the threshold. In particular, as will be explained in more detail below, the total incremental change in fueling implemented by controller 52 based on a particular speed deviation when the probability is low will be calculated based on conditions occurring at only time $T_0$, whereas the total incremental change in fueling will be based also on anticipated conditions occurring at times $T_1$-$T_4$ when the probability is high. For this reason, the weighting factor $W_0$ for time $T_0$ when the probability is low may be higher than when the probability is high, as a portion of the resulting change in fueling will be contributed to by the anticipated conditions.

After completion of steps 310, 325, and 330, control may proceed to step 335, where a Fuel Offset Vector is determined by controller 52 (Step 335). The Fuel Offset Vector may be determined via EQ. 1 below:

$$\text{Offset}_{final} = W_0 * F_0 + P_{cycle}(W_1 F_1 + W_2 F_2 + W_3 F_3 \ldots + W_m F_m) \quad \text{EQ. 1}$$

wherein:

Offset$_{final}$ is the total change to current fueling that should accommodate the current speed deviation given current conditions;

$W_0$ is the weighting factor determined based on the classification probability in step 325 or 330;

$F_0$ is the error-based fuel value for time $T_0$ given the current total load determined based on the gain value from step 325 or 330;

$P_{cycle}$ is the probability that the current operation was correctly classified;

$W_m$ is the weighting factor determined based on the classification probability and the sequence of time $T_m$ in the excavation cycle; and $F_m$ is the error-based fuel value for time $T_m$.

As can be seen in EQ. 1 above, the Fuel Offset Vector includes two parts. Specifically, the Fuel Offset Vector includes a closed-loop gain or adjustment value ($W_0 * F_0$) associated with only time $T_0$, and an open-loop gain or adjustment value ($P_{cycle}(W_1 F_1 + W_2 F_2 + W_3 F_3 + \ldots + W_m F_m)$) associated with future times $T_1$-$T_m$ that is superimposed on the closed-loop gain.

When control passes through step 325 (i.e., when the classification probability is low), $W_1 = W_2 = \ldots = W_m = 0$. In this situation, the Fuel Offset Vector may include only the closed-loop gain. In other words, when the classification probability is less than the threshold amount, the Fuel Offset Vector may be equal to $W_0 * F_0$.

However, when control passes through step 330 (i.e., when the classification probability is high), the Fuel Offset Vector may include both the closed-loop gain and the open-loop gain. Continuing with the example from above, because the probability of correct classification is greater than about 50%, controller 52 may determine the Fuel Offset Vector as a function of time $T_0$ (corresponding to the start of move-to-truck segment) and as a function of times $T_1$-$T_4$ (corresponding to a stop at the end of the current move-to-truck segment, the dump segment, a start of the move-to-trench segment, and a stop at the end of the move-to-trench segment).

A typical excavation machine may normally droop significantly in speed at the start of the move-to-truck segment (and thus require a significant increase in fuel to maintain desired engine speeds), overshoot the desired speed during the dump segment (and thus require less fuel), and droop in speed to a lesser degree at the start of the return-to-trench segment (and thus require more fuel). To account for the anticipated drooping and overspeeding events, controller 52 may calculate the error-based fuel values for times $T_0$-$T_4$ to have respective values of (5.2 mm, 5.0 mm, 4.3 mm, 5 mm, 4.8 mm). And using the weighting factors provided above, the final offset vector used by controller 52 to accommodate the speed droop at time $T_0$ during the move-to-truck segment of the truck loading cycle may be as follows:

$$\text{Offset}_{final} = 80\% * 5.2 \text{ mm} + 70\%(7\% * 5.0 \text{ mm} + 6\% * 4.3 \text{ mm} + 5\% * 5.0 \text{ mm} + 2\% * 4.8 \text{ mm})$$

After determining the Fuel Offset Vector, controller 52 may calculate the total change in current fueling required to accommodate the speed deviation of power train 16 (i.e., Offset$_{final}$) according to the determined vector equation (i.e., EQ. 1) (Step 340). In the disclosed example, the total change in current fueling may be an increase of about 4.83 mm.

It should be noted that the amount calculated in step 340 (using the closed- and open-loop gains of EQ. 1) may be slightly less (in the current example) than would be calculated (using only the closed-loop gain) if the probability of classification matching was less than the threshold amount. The reason for this is that the current increase in fueling, while attempting to accommodate a current underspeed event caused by the start of the move-to-truck segment, may also be anticipating a future overspeed event caused by dumping of the load from work tool 20 yet to occur. Thus, instead of incrementing fueling by a larger amount to bring the actual engine speed completely up to the desired engine speed (e.g., up to 1900 rpm) and risking an exaggerated overspeed event during the ensuing dump segment, the incremental fueling may instead be calculated to only bring the actual engine speed up to a lower acceptable boundary (e.g., 1880 rpm) associated with the desired engine speed. In this way, a cushion or buffer zone of about 40 rpm (i.e., 1900 rpm+/−20 rpm) may be used when trying to accommodate the overspeed event that may be caused by completion of the dumping segment. As a result, fuel may be conserved and the overall actual engine speed may be maintained closer to the desired engine speed throughout the excavation cycle.

Controller 52 may then compare the total change in current fueling to the fuel and/or smoke limit maps stored in memory (Step 345). If the total change in current fueling is less than the limits contained within the maps (step 345: Yes), the total change may be validated (Step 350). However, if the total change in current fueling exceeds any of the limits, the lower of the limits (i.e., the lower of a value from the fuel limit map or a value from the smoke limit map) may then be validated (Step 355). Controller 52 may then selectively implement the validated value to increase or decrease engine fueling (Step 360).

Several benefits may be associated with the disclosed control system. First, because controller 52 may classify the current excavation operation according to speeds, forces, ranges of motion, and/or operator input, variability in the excavation process may be accounted for. And, because controller 52 may adapt its regulation of engine speed based on the classification, performance (e.g., fuel efficiency and/or speed control) of machine 10 during each operation may be enhanced. This may be particularly beneficial during heavily loaded operations, for example during digging and/or move-to-truck operations where boom 28 is raising under heavy load and could benefit from increased velocity, and during empty raising or lowering of boom 28 where an improvement in controllability is desired.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A control system for a powertrain of a machine, comprising:
   a first sensor configured to generate a first signal indicative of an actual speed of the powertrain;
   a second sensor configured to venerate a second signal indicative of at least one of a force bearing on the machine and a position of an implement of the machine;
   an interface device configured to generate a third signal indicative of a desired speed of the powertrain; and
   a controller in communication with the first sensor, the second sensor, and the interface device, the controller being configured to:
      determine a closed-loop gain value based on a difference between the actual speed and the desired speed;
      classify a current operation of the machine as one of a plurality of predetermined operations of a duty cycle based on the second signal;
      determine an open-loop gain value based on classification of the current operation of the machine; and
      control fueling of the machine based on a superposition of the closed-loop gain value and the open-loop gain value.

2. The control system of claim 1, wherein the controller is further configured to:
   record a history of machine operations; and
   classify the current operation by comparing the current operation to the history.

3. The control system of claim 2, wherein the machine operations include at least one of a tool movement, a machine movement, a movement of an operator interface device, and a change in a load bearing on the machine.

4. The control system of claim 1, wherein:
   the machine includes a work tool;
   the controller is configured to determine a load bearing on the machine as a function of the second signal and a known weight of the machine; and
   the closed-loop gain value is determined based also on the load.

5. The control system of claim 4, further including at least one grade sensor configured to generate a fourth signal indicative of a work surface grade on which the machine is operating, wherein the controller is further configured to determine the load based also on the work surface grade and a travel direction relative to the work surface grade.

6. The control system of claim 5, further including at transmission sensor configured to generate a signal indicative of a gear ratio of the powertrain, wherein the controller is further configured to determine the load based also on the gear ratio.

7. The control system of claim 1, wherein:
   the controller is configured to determine a weighting factor based on a probability that the classification is correct; and
   the open-loop gain value is determined as a function of the weighting factor.

8. The control system of claim 7, wherein when the probability is less than a threshold amount, the open-loop gain value is zero.

9. The control system of claim 8, wherein when the probability is higher than the threshold amount, the open-loop gain value is determined based on at least one machine state predicted for a future time in the duty cycle.

10. The control system of claim 9, wherein the controller is further configured to:
    determine a vector of adjustment values for a plurality of anticipated future times in the duty cycle; and
    selectively use the vector of adjustment values to determine the open-loop gain value.

11. The control system of claim 10, wherein the controller is further configured to:
    determine a weighting for each of the plurality of anticipated future times; and
    apply the weighting to each adjustment value in the vector to determine the open-loop gain value.

12. The control system of claim 11, wherein the weighting decreases for anticipated future times of the duty cycle that are more distant from a current instant in time.

13. The control system of claim 9, wherein the closed-loop gain value is greater when the probability is less than the threshold amount.

14. The control system of claim 1, wherein the controller is further configured to:
    determine a change in fueling as a function of the superposition;
    compare the change in fueling to a value in a limit map; and
    selectively implement a lower of the change in fueling and the value in the limit map.

15. A method for controlling a powertrain of a machine, the method comprising:
    sensing an actual speed of the powertrain;
    sensing at least one of a force bearing on the machine and a position of an implement of the machine;
    receiving a desired speed of the powertrain;
    determining a closed-loop gain value based on a difference between the actual speed and the desired speed;
    classifying a current operation of the machine as one of a plurality of predetermined operations of a duty cycle based on the at least one of the force bearing on the machine and the position of the implement of the machine;
    determining an open-loop gain value based on the current operation of the machine; and
    controlling fueling of the machine based on a superposition of the closed-loop gain value and the open-loop gain value.

16. The method of claim 15, further including recording a history of machine operations, wherein classifying the current operation includes comparing the current operation to the history of machine operations.

17. The method of claim 15, further including sensing a work surface grade over which the machine is operating, wherein:
    the machine includes a work tool; and
    the sensing at least one of a force bearing on the machine and a position of the implement includes determining a load moved by the machine as a function of a load in the work tool, a known weight of the machine, and the work surface grade.

18. The method of claim 15, further including determining a weighting factor based on a probability that the current operation of the machine was correctly classified, wherein the determining the open-loop gain value includes determining the open-loop gain value as a function of the weighting factor.

19. The method of claim 18, wherein:
    when the probability is less than a threshold amount, determining the open-loop gain value includes setting the open-loop gain value to zero; and when the probability is higher than the threshold amount, the determining the open-loop gain value includes determining the open-loop gain value based on an anticipated future time in the duty cycle.

20. A computer readable medium having executable instructions stored thereon for performing a method for controlling a powertrain of a machine, the method comprising:

sensing an actual speed of the powertrain;

sensing at least one of a force bearing on the machine and a position of an implement of the machine;

receiving a desired speed of the powertrain;

determining a closed-loop gain value based on a difference between the actual speed and the desired speed;

classifying a current operation of the machine as one of a plurality of predetermined operations of a duty cycle based on the at least one of the force bearing on the machine and the position of the implement of the machine;

determining an open-loop gain value based on the current operation of the machine; and controlling fueling of the machine based on a superposition of the closed-loop gain value and the open-loop gain value.

* * * * *